US007806653B2

(12) United States Patent
Burton et al.

(10) Patent No.: US 7,806,653 B2
(45) Date of Patent: Oct. 5, 2010

(54) GAS TURBINE ENGINES INCLUDING MULTI-CURVE STATOR VANES AND METHODS OF ASSEMBLING THE SAME

(75) Inventors: Scott Andrew Burton, Cincinnati, OH (US); Chander Prakash, Cincinnati, OH (US); Joseph Machnaim, Bangalore (IN); David Glenn Cherry, Loveland, OH (US); Robert John Beacock, Cincinnati, OH (US); Ching-Pang Lee, Cincinnati, OH (US); Scott Michael Carson, Mason, OH (US)

(73) Assignee: General Electric Company, Schenectady, NY (US)

( * ) Notice: Subject to any disclaimer, the term of this patent is extended or adjusted under 35 U.S.C. 154(b) by 843 days.

(21) Appl. No.: 11/615,556

(22) Filed: Dec. 22, 2006

(65) Prior Publication Data

US 2008/0152505 A1   Jun. 26, 2008

(51) Int. Cl.
*F01D 9/00* (2006.01)
(52) U.S. Cl. ...................................... 415/191
(58) Field of Classification Search ................. 415/191, 415/199.5, 209.1, 211.2
See application file for complete search history.

(56) References Cited

U.S. PATENT DOCUMENTS

| 3,745,629 | A | * | 7/1973 | Pask et al. ............... 29/889.22 |
| 4,470,755 | A |   | 9/1984 | Bessay |
| 4,826,400 | A |   | 5/1989 | Gregory |
| 4,985,992 | A |   | 1/1991 | Vosgien |
| 5,249,922 | A |   | 10/1993 | Sato et al. |
| 5,408,747 | A |   | 4/1995 | Fredmonski et al. |
| 5,482,433 | A | * | 1/1996 | Norris et al. ............. 415/173.7 |
| 6,071,077 | A | * | 6/2000 | Rowlands ............... 416/223 A |
| 6,099,248 | A |   | 8/2000 | Mumm et al. |
| 6,554,564 | B1 | * | 4/2003 | Lord .......................... 415/119 |
| 7,121,792 | B1 | * | 10/2006 | Fessou et al. ............... 415/191 |
| 2007/0033802 | A1 |   | 2/2007 | McKeever |
| 2008/0148564 | A1 | * | 6/2008 | Burton et al. ............ 29/888.02 |

* cited by examiner

*Primary Examiner*—Edward Look
*Assistant Examiner*—Ryan H Ellis
(74) *Attorney, Agent, or Firm*—William Scott Andes, Esq.; Armstrong Teasdale LLP

(57) ABSTRACT

A stator vane that may be used in engine assemblies. The stator vane includes an airfoil having a first sidewall and a second sidewall that is coupled to the first sidewall at a leading edge and at a trailing edge. The airfoil extends radially from a root portion to a tip portion. Each of the leading and trailing edges includes at least one lean directional change and a plurality of sweep directional changes that are defined between the root portion and the tip portion.

15 Claims, 8 Drawing Sheets

US 7,806,653 B2

GAS TURBINE ENGINES INCLUDING MULTI-CURVE STATOR VANES AND METHODS OF ASSEMBLING THE SAME

BACKGROUND OF THE INVENTION

This invention relates generally to gas turbine engines, and more specifically to turbine nozzle assemblies in gas turbine engines.

In at least some known gas turbine engines, combustion gases flow through a high-pressure turbine and a low-pressure turbine to generate torque, which powers the upstream compressor and fan. In at least some known low-pressure turbine assemblies, the low-pressure turbine is rotatably coupled to a front fan assembly. Stator vanes in the low-pressure turbine channel combustion gases downstream towards a row of rotating turbine blades. The gas flow induces rotation to the turbine blades which causes rotation of the front fan assembly.

The flowfield of the combustion gases that travel through the turbines can be complex. For example, portions of the outer surfaces of the vanes, blades, and/or other components of the turbine assembly may induce secondary flows in the combustion gases that are perpendicular to the direction of the core flow. Such secondary flows may cause an undesirable loss in pressure and a reduction in engine efficiency. Optimizing the surroundings of the flowfield may facilitate reducing pressure losses and improving engine efficiency.

BRIEF DESCRIPTION OF THE INVENTION

In one aspect, a method for assembling a gas turbine engine is provided. The method includes coupling at least one stator assembly that has at least one stator vane extending from an inner band within the gas turbine engine. The stator vane extends from a root portion extending from the inner band to a tip portion. The stator vane includes at least one lean directional change and a plurality of sweep directional changes that are defined between the root portion and the tip portion. The method also includes coupling at least one turbine blade assembly having at least one rotor blade downstream from the stator assembly.

In another aspect, a stator vane is provided. The stator vane includes an airfoil having a first sidewall and a second sidewall that is coupled to the first sidewall at a leading edge and at a trailing edge. The airfoil extends radially from a root portion to a tip portion. Each of the leading and trailing edges includes at least one lean directional change and a plurality of sweep directional changes that are defined between the root portion and the tip portion.

In another aspect, a turbine nozzle assembly is provided. The turbine nozzle assembly includes a radially inner band and at least one stator vane that extends radially outward from the inner band. The stator vane includes an airfoil having a root portion that extends from the inner band to a tip portion. The airfoil also includes at least one lean directional change and a plurality of sweep directional changes that are defined between the root portion and the tip portion.

DETAILED DESCRIPTION OF THE INVENTION

The present invention provides a method and components that facilitate reducing secondary flows in gas turbine engines, such that engine efficiency is facilitated to be increased. Although embodiments discussed herein include stator vanes, turbine assemblies, gas turbine engines, and methods of manufacturing the same, those having ordinary skill in the art will appreciate that the present invention is not limited to use with gas turbine engines or any of the exemplary embodiments described or illustrated herein.

Figure 1:
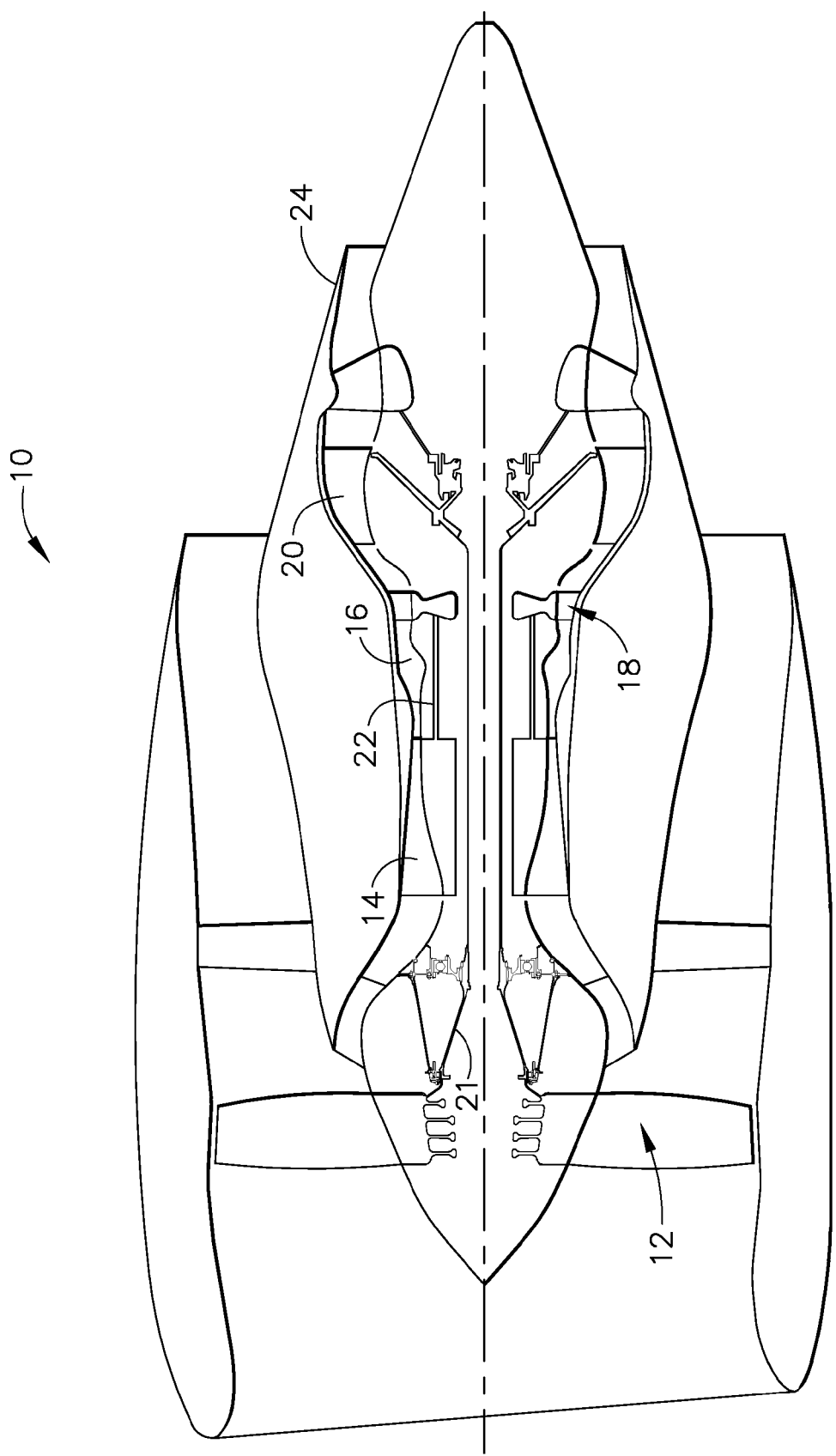
FIG. 1 is a schematic illustration of an exemplary gas turbine engine.

FIG. 1 is a schematic illustration of an exemplary gas turbine engine 10 including a fan assembly 12, a high-pressure compressor 14, and a combustor 16. Engine 10 also includes a high-pressure turbine 18 and a low-pressure turbine 20. Fan assembly 12 and low-pressure turbine 20 are coupled by a first shaft 21, and compressor 14 and high-pressure turbine 18 are coupled by a second shaft 22. In one embodiment, gas turbine engine 10 is a GE90 engine commercially available from General Electric Aircraft Engines, Cincinnati, Ohio.

During operation, air flows through fan assembly 12 supplying compressed air to high-pressure compressor 14. The highly compressed air is delivered to combustor 16. Airflow from combustor 16 is channeled through one or more turbine nozzle assemblies (not shown in FIG. 1) to drive turbines 18 and 20, prior to exiting gas turbine engine 10 through an exhaust nozzle 24. More specifically, pressurized air from high-pressure compressor 14 is mixed with fuel in combustor 16 and ignited, thereby generating combustion gases. The combustion gases induce rotation of high-pressure turbine 18 which causes rotation of high-pressure compressor 14. The combustion gases are discharged from high-pressure turbine 18 into low-pressure turbine 20. The core airflow is discharged from low-pressure turbine 20 and directed aftward towards exhaust nozzle 24.

Figure 2:
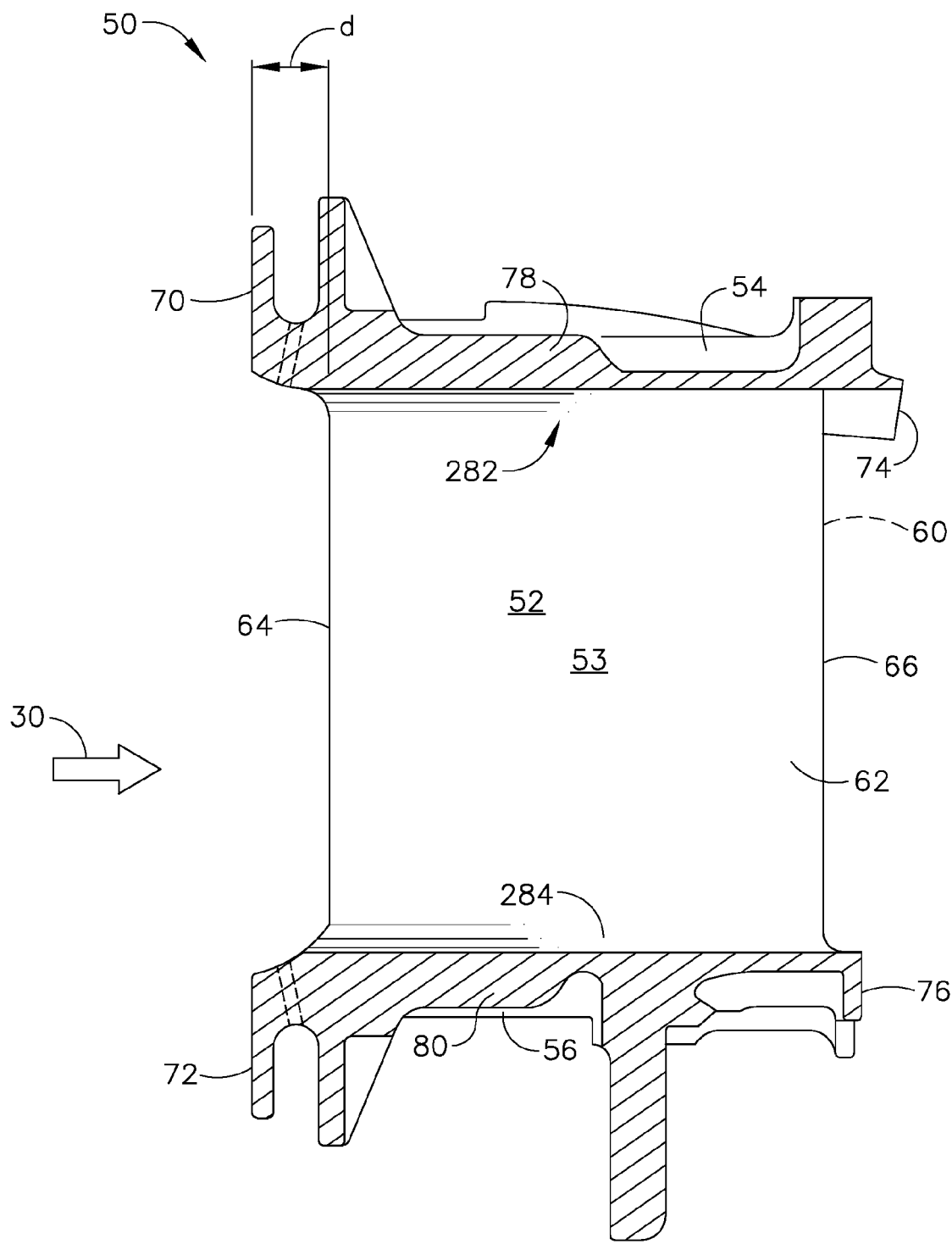
FIG. 2 is a side view of an exemplary known turbine nozzle assembly that may be used in the gas turbine engine shown in FIG. 1.

FIG. 2 is a side view of an exemplary turbine nozzle assembly 50 that may be used with a turbine engine, such as but not limited to gas turbine engine 10 (shown in FIG. 1). Although the present invention is described with reference to turbine nozzle assembly 50, those having ordinary skill in the art will appreciate that the present invention is not limited to use with turbine nozzle assembly 50 but may be used with other assemblies, such as a stator assembly. Nozzle assembly 50 includes a stator vane 52 that includes an airfoil 53 formed by a pressure-side sidewall 60 and a suction-side sidewall 62 that are joined together at a leading edge 64 and at a chordwisespaced trailing edge 66 such that a cooling cavity (not shown in FIG. 2) is defined between sidewalls 60 and 62. Airfoil sidewalls 60 and 62 each extend radially between an outer band 54 and an inner band 56. In the exemplary embodiment, sidewall 60 is concave, and sidewall 62 is convex such that stator vane 52 has a cambered profile. Furthermore, airfoil 53 includes a tip portion 282 and a root portion 284.

Outer band 54 includes a leading edge surface 70, a trailing edge surface 74, and a body 78 extending therebetween. Inner band 56 includes a leading edge surface 72, a trailing edge surface 76, and a body 80 extending therebetween. In the exemplary embodiment, stator vane 52 is oriented such that outer and inner band leading edge surfaces 70 and 72, respectively, are each a distance d upstream from stator vane leading edge 64.

Figure 3:
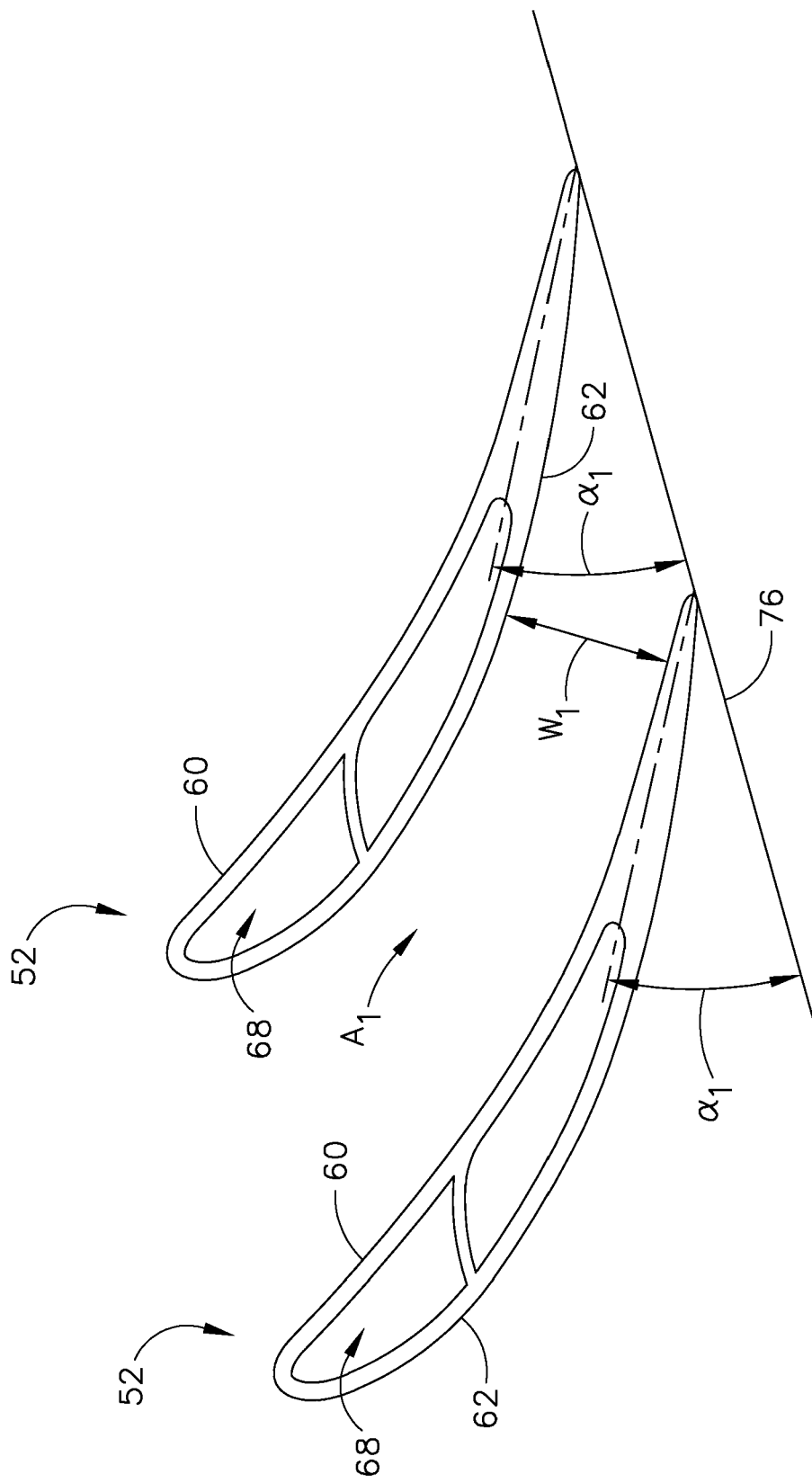
FIG. 3 is a cross-sectional view of two known stator vanes that may be used with the nozzle assembly shown in FIG. 2.

FIG. 3 is a bottom cross-sectional view of a pair of adjacent stator vanes 52 that may be used with turbine nozzle assembly 50. Stator vanes 52 are each oriented at an angle $\alpha_1$ with respect to trailing edge 76 on inner band 56 such that a throat area $A_1$ is defined between vanes 52. By adjusting angle $\alpha_1$, a width $W_1$ of throat area $A_1$ can be increased or decreased. More specifically, increasing throat area $A_1$ facilitates increasing a mass flow of air channeled between stator vanes 52, and decreasing throat area $A_1$ facilitates decreasing the mass flow of air channeled between stator vanes 52.

Figure 4:
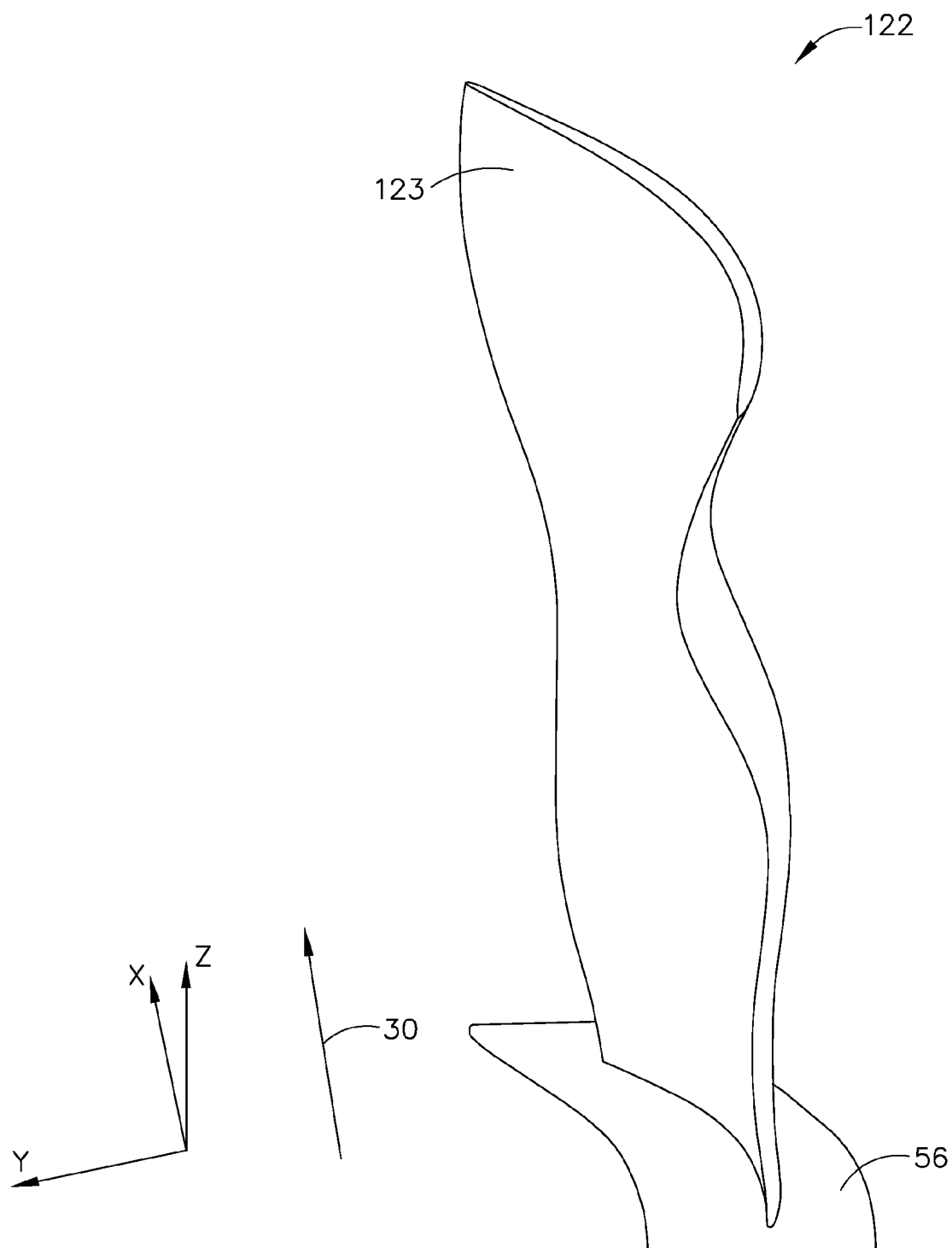
FIG. 4 illustrates an exemplary multi-curve vane that may be used in the gas turbine engine shown in FIG. 1.
Figure 5:
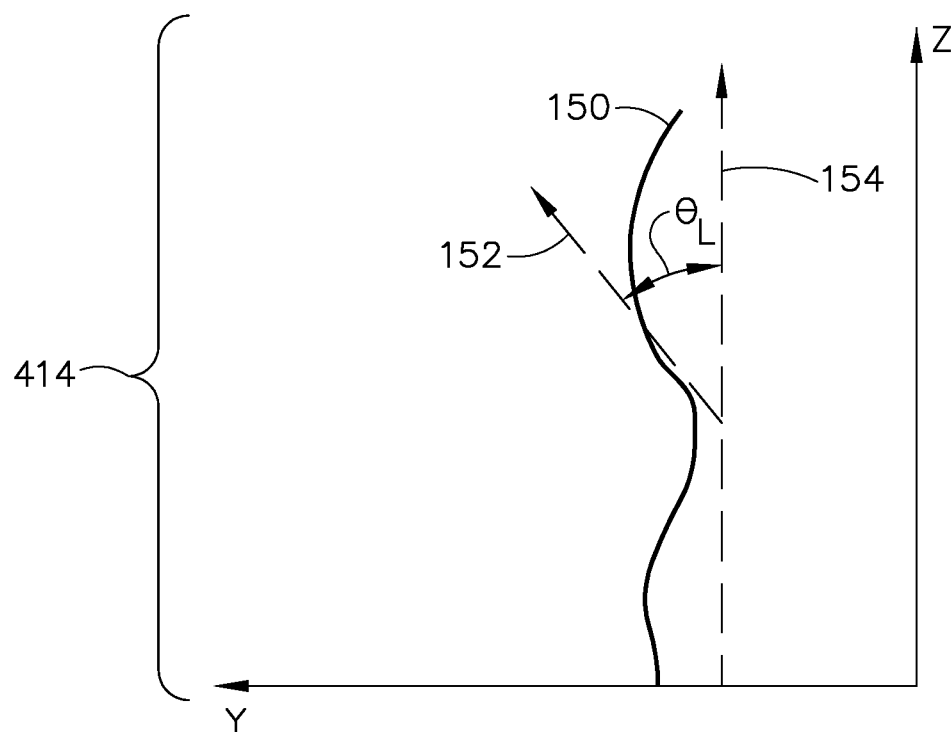
FIG. 5 illustrates a centerline cross-sectional view of the multi-curve vane shown in FIG. 4.

FIGS. 4 and 5 illustrate an exemplary multi-curve vane 122 that may be used with turbine nozzle assembly 50. More specifically, FIG. 4 is a perspective view of vane 122 and includes three exemplary orthogonal axes including an axial axis (X-axis), a tangential or circumferential axis (Y-axis), and a radial axis (Z-axis). FIG. 5 illustrates a cross-sectional view of vane 122 taken through centerline 150 and along the Y-Z plane. Centerline 150 extends from root portion 184 to tip portion 182 along the surface of sidewall 62. In the exemplary embodiment, the X-axis extends downstream relative to flow-path 30, the Z-axis extends radially outwardly from inner band 56 (shown in FIG. 2), and the Y-axis extends in the circumferential direction.

As used herein, the term "lean" is defined as a radial angle $\Theta_L$ defined between a surface tangent 152 of vane 122 in Y-Z plane and a line 154 extending substantially parallel to the Z-axis. In some embodiments, the amount of lean of vane 122 is referred to as "tilt." If a portion of stator vane 122 has a negative radial angle $\Theta_L$ with respect to line 154 (as shown in FIG. 5), then that portion of vane 122 has a forward lean. If a portion of stator vane 122 has a positive radial angle $\Theta_L$ with respect to line 154, then that portion of vane 122 has a backward lean. Described in more detail below, vane 122 includes an airfoil 123 including a plurality of lean portions. As used herein, the term "lean portion" refers to a radially-extending portion of vane 122 that is defined between a pair of radially adjacent lean directional changes, or between a lean directional change and tip portion 282, or between an lean directional change and root portion 284. As used herein, the term "lean directional change" refers to a point defined on airfoil 123 in which the direction of lean changes from a forward lean to a backward lean, or vice-versa.

Figure 6:
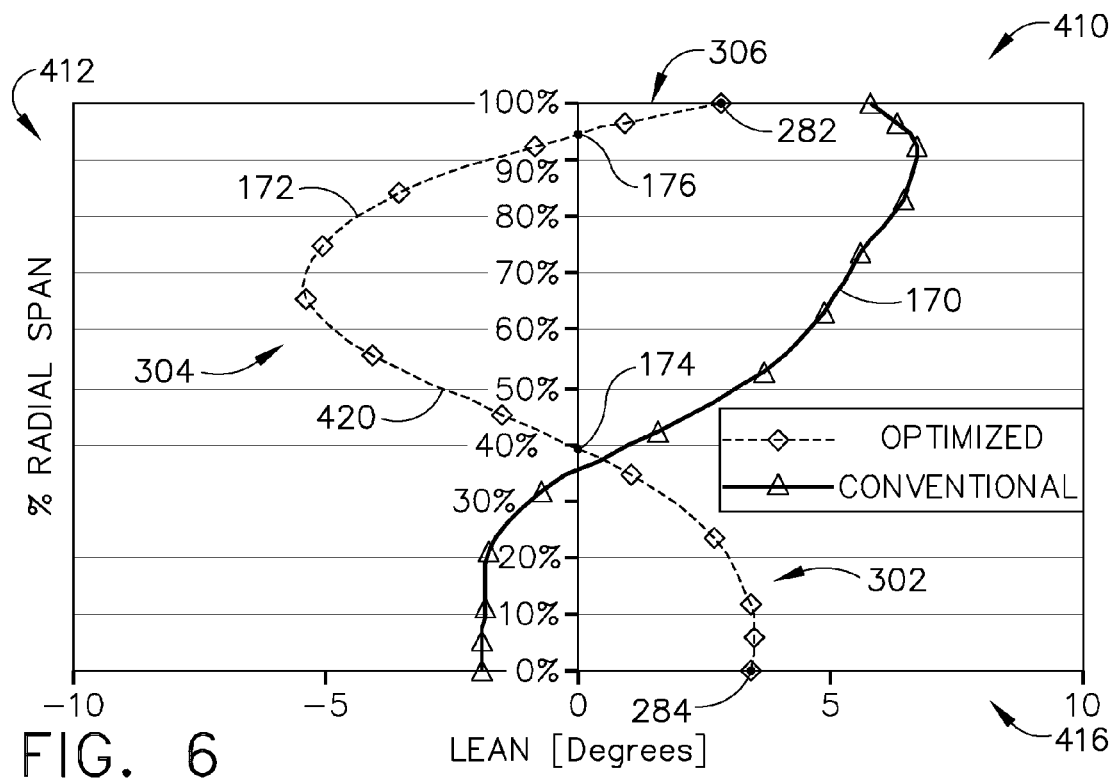
FIG. 6 is a graph illustrating exemplary lean angle values at the leading edge of the multi-curve vane shown in FIG. 4.

FIG. 6 is a graph 410 illustrating exemplary lean angle values 172 corresponding to leading edge 64 of vane 122. More specifically, the lean angle values 172 associated with leading edge 64 are plotted graphically wherein the ordinate 412 of graph 410 represents a percent of span of airfoil 123, and the abscissa 416 of graph 410 represents an amount of lean angle $\Theta_L$, as measured in degrees, of leading edge 64. For illustrative purposes, a solid line 170 represents an amount of lean associated with a conventional stator vane. Accordingly, at root portion 284, represented at a radial span of 0%, the lean angle value 172 of leading edge 64 is approximately equal to 4°. Airfoil 123 leans backwards from root portion 284 to a radial span of approximately 40%, wherein the airfoil lean changes from a positive lean angle to a negative lean angle at a lean directional change 174. Airfoil 123 leans forward from directional change 174 to a radial span of approximately 95%, wherein a lean directional change 176 is defined. Airfoil 123 leans backwards from directional change 176 to tip portion 282. Accordingly, in the exemplary embodiment, vane 122 includes two lean directional changes 174 and 176 defined on leading edge 64. Alternatively, vane 122 may include any number of lean directional changes defined on leading edge 64.

In the exemplary embodiment, airfoil 123 includes three lean portions 302, 304, and 306 defined along leading edge 64. A first lean portion 302 is defined between root portion 284 and directional change 174, a second lean portion 304 is defined between directional change 174 and directional change 176, and a third lean portion 306 is defined between directional change 176 and tip portion 282. Accordingly, in the exemplary embodiment, leading edge 64 includes one lean portion 302 defined between root portion 284 and a midpoint 420 of airfoil 123. In the exemplary embodiment, lean portion 302 extends across approximately 40% of airfoil 123. Second lean portion 304 begins between root portion 284 and midpoint 420 and extends across approximately 45% of airfoil 123. As such, in the exemplary embodiment, leading edge 64 has a reverse S-shape. Alternatively, vane 122 may have any number of lean portions forming a variety of shapes on leading edge 64.

Figure 7:
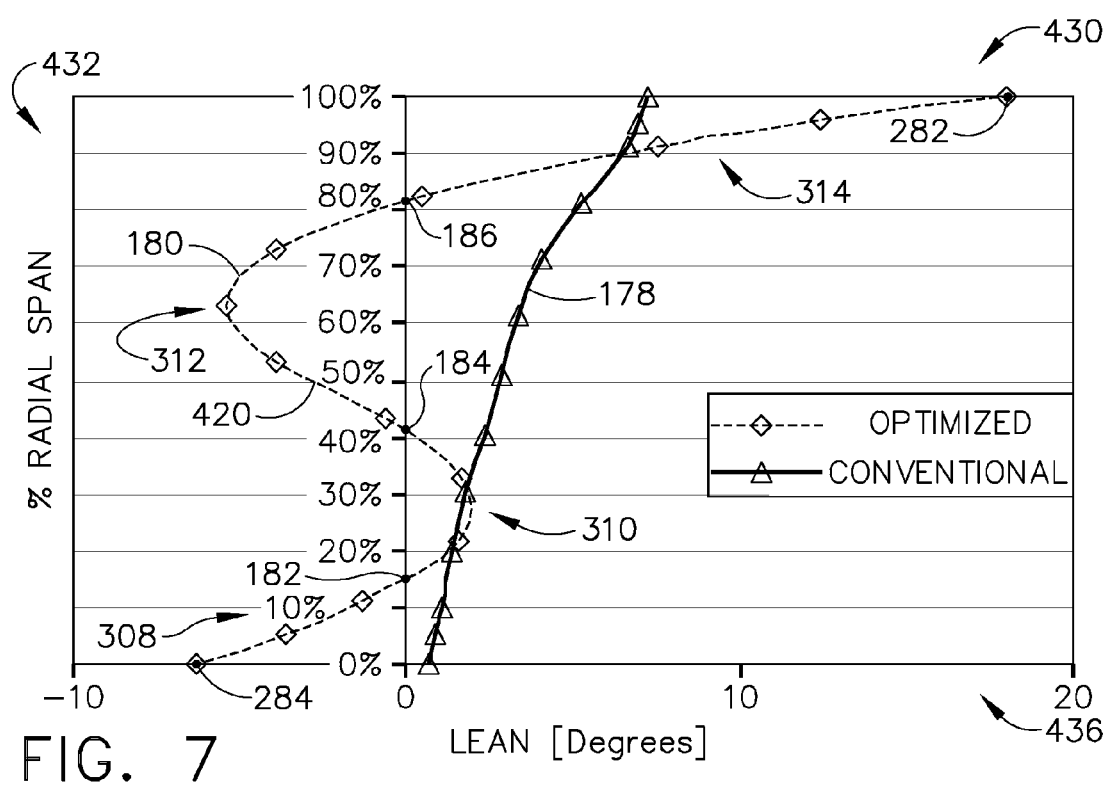
FIG. 7 is a graph illustrating exemplary lean angle values at the trailing edge of the multi-curve vane shown in FIG. 4.

FIG. 7 is a graph 430 illustrating exemplary lean angle values 180 corresponding to trailing edge 66 of vane 122. More specifically, the lean angle values 180 associated with trailing edge 66 are plotted graphically wherein the ordinate 432 of graph 430 represents a percent of span of airfoil 123, extending from root portion 284 to tip portion 282, and the abscissa 436 of graph 430 represents an amount of lean angle $\Theta_L$, in degrees, for trailing edge 66. For illustrative purposes, a solid line 178 represents an amount of lean associated with a conventional stator vane. Accordingly, at root portion 284, represented at a radial span of 0%, the lean angle value 180 of trailing edge 66 is approximately equal to −6°. Airfoil 123 leans forward from root portion 284 to a radial span of approximately 15%, wherein the airfoil lean changes from a negative lean angle to a positive lean angle at a lean directional change 182. Airfoil 123 leans backwards from directional change 182 to a radial span of approximately 40%, wherein a lean directional change 184 is defined. Airfoil 123 leans forward from directional change 184 to a radial span of approximately 80%, wherein a lean directional change 186 is defined. Accordingly, in the exemplary embodiment, vane 122 includes three lean directional changes 182, 184, and 186 defined on trailing edge 66. Alternatively, vane 122 may include any number of lean directional changes defined on trailing edge 66.

In the exemplary embodiment, vane 122 includes four lean portions 308, 310, 312, and 314 defined along trailing edge 66. A first lean portion 308 is defined between root portion 284 and directional change 182, a second lean portion 310 is defined between directional change 182 and directional change 184, a third lean portion 312 is defined between directional change 184 and directional change 186, and a fourth lean portion 314 is defined between directional change 186 and tip portion 282. Accordingly, in the exemplary embodiment, vane 122 includes two lean portions 308 and 310 that are defined before midpoint 420. As such, trailing edge 66 has a S-shape. Alternatively, vane 122 may include any number of lean portions defined before or after midpoint 420 and may have a variety of shapes.

Figure 8:
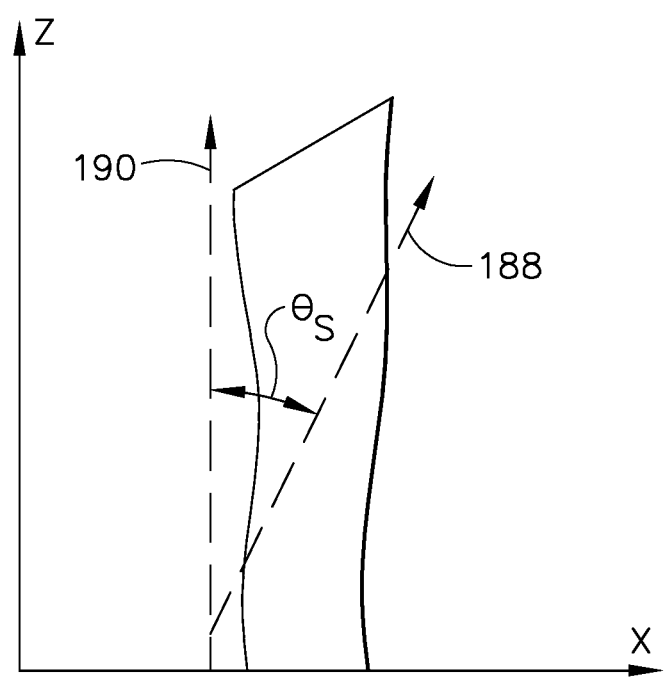
FIG. 8 is a side-perspective view of an exemplary sweep angle of the multi-curve vane shown in FIG. 4.

FIG. 8 illustrates an exemplary sweep angle as oriented on vane 122. As used herein, the term "sweep" is defined as a radial angle $\Theta_S$ defined between a surface tangent 188 to vane 122 in the X-Z plane and a nominal line 190 extending substantially parallel to the Z-axis. If a portion of stator vane 122 has a negative radial angle $\Theta_S$ with respect to line 190, then that portion of stator vane 122 has a backward sweep. If a portion of stator vane 122 has a positive radial angle $\Theta_S$ with respect to line 190, then that portion of vane 122 has a forward sweep. As described in more detail below, airfoil 123 includes a plurality of sweep portions 352, 354, 356, 358, 360, 362, and 364. As used herein, the term "sweep portion" refers to a radially-extending portion of vane 122 that is defined between a pair of radially adjacent sweep directional changes, or between a sweep directional change and tip portion 282, or between a sweep directional change and root portion 284. As used herein, the term "sweep directional change" refers to a point of airfoil 123 in which the direction of sweep changes from a forward sweep to a backward sweep, or vice-versa.

Figure 9:
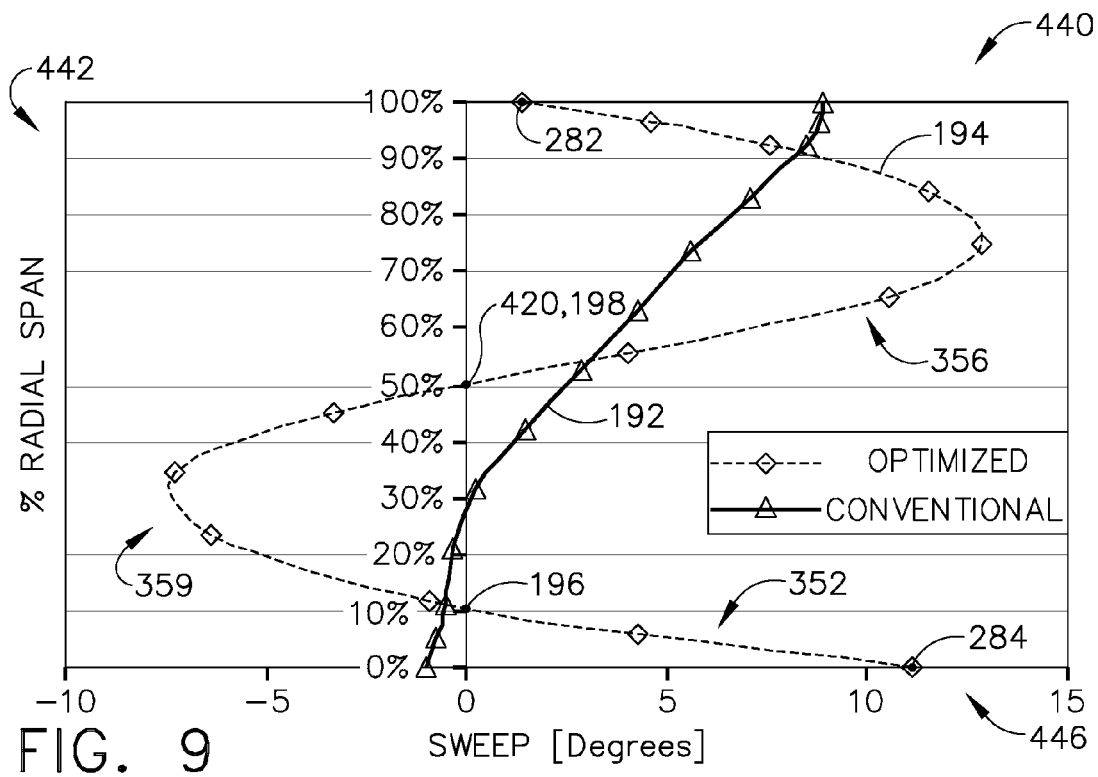
FIG. 9 is a graph illustrating exemplary sweep angle values at the leading edge of the multi-curve vane shown in FIG. 4.

FIG. 9 is a graph 440 illustrating exemplary sweep angle values 194 associate with leading edge 64 of vane 122. More specifically, the sweep angle values 194 associated with leading edge 64 are plotted graphically wherein the ordinate 442 of graph 440 represents a percent of span of airfoil 123 extending from root portion 284 to tip portion 282, and the abscissa 446 of graph 440 represents an amount of sweep angle $\eta_S$, in degrees, of leading edge 64. For illustrative purposes, a solid line 192 represents an amount of sweep associated with a conventional stator vane. Accordingly, at root portion 284, represented at a radial span of 0%, the sweep angle value 194 of leading edge 64 is approximately equal to 12°. Airfoil 123 sweeps forward from root portion 284 to a radial span of approximately 10%, wherein the sweep changes from a positive sweep angle to a negative sweep angle at a sweep directional change 196. Airfoil 123 sweeps backwards from directional change 196 to a radial span of approximately 50%, wherein another sweep directional change 198 is defined. Airfoil 123 sweeps forward from directional change 198 to tip portion 282. Accordingly, in the exemplary embodiment, vane 122 includes two sweep directional changes 196 and 198 on leading edge 64. Alternatively, vane 122 may have any number of sweep directional changes on leading edge 64.

In the exemplary embodiment, vane 122 includes three sweep portions 352, 354, and 356. A first sweep portion 352 is defined between root portion 284 and directional change 196. A second sweep portion 354 is defined between directional change 196 and directional change 198. A third sweep portion 356 is defined between directional change 198 and tip portion 282. Accordingly, in the exemplary embodiment, vane 122 includes two sweep portions 352 and 354 defined between root portion 282 and midpoint 420. Alternatively, vane 122 may have any number of sweep portions on leading edge 64.

Figure 10:
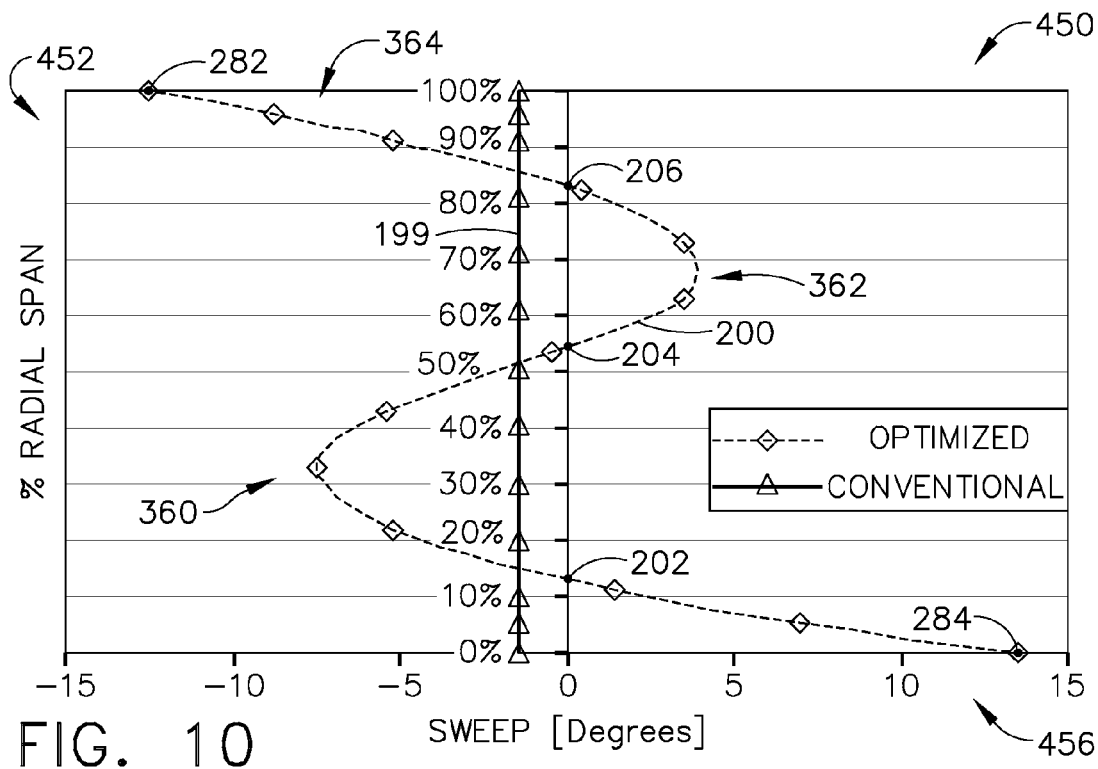
FIG. 10 is a graph illustrating exemplary sweep angle values at the trailing edge of the multi-curve vane shown in FIG. 4.

FIG. 10 is a graph 450 illustrating exemplary sweep angle values 200 associate with trailing edge 66 of vane 122. More specifically, the sweep angle values 200 associated with trailing edge 66 are plotted graphically wherein the ordinate 452 of graph 450 represents a percent of span of airfoil 123 extending from root portion 284 to tip portion 282, and the abscissa 456 of graph 450 represents an amount of sweep angle $\Theta_S$, in degrees, for trailing edge 66. For illustrative purposes, a solid line 199 represents an amount of sweep associated with a conventional stator vane. Accordingly, at root portion 284, represented at a radial span of 0%, the sweep angle value 200 of trailing edge 66 is approximately equal to 14°. Airfoil 123 sweeps forward from root portion 284 to a radial span of approximately 14%, wherein the sweep changes from a positive sweep angle to a negative sweep angle at a sweep directional change 202. Airfoil 123 sweeps backwards from directional change 202 to a radial span of approximately 55%, wherein a sweep directional change 204 is defined. Airfoil 123 sweeps forward from directional change 204 to a radial span of approximately 84%, wherein a sweep directional change 206 is defined. Airfoil 123 sweeps backwards from directional change 206 to tip portion 282. Accordingly, in the exemplary embodiment, vane 122 includes three sweep directional changes 202, 204, and 206 defined across trailing edge 66. Alternatively, vane 122 may have any number of sweep directional changes defined across trailing edge 66.

In the exemplary embodiment, vane 122 includes sweep portions 358, 360, 362, and 364 defined across trailing edge 66. A first sweep portion 358 is defined between root portion 284 and directional change 202. A second sweep portion 360 is defined between directional change 202 and directional change 204. A third sweep portion 362 is defined between directional change 204 and directional change 206. A fourth sweep portion 364 is defined between directional change 206 and tip portion 282. Accordingly, in the exemplary embodiment, trailing edge 64 includes four sweep portions 358, 360, 362, and 364. Alternatively, vane 122 may have any number of sweep portions defined across trailing edge 66.

Figure 11:
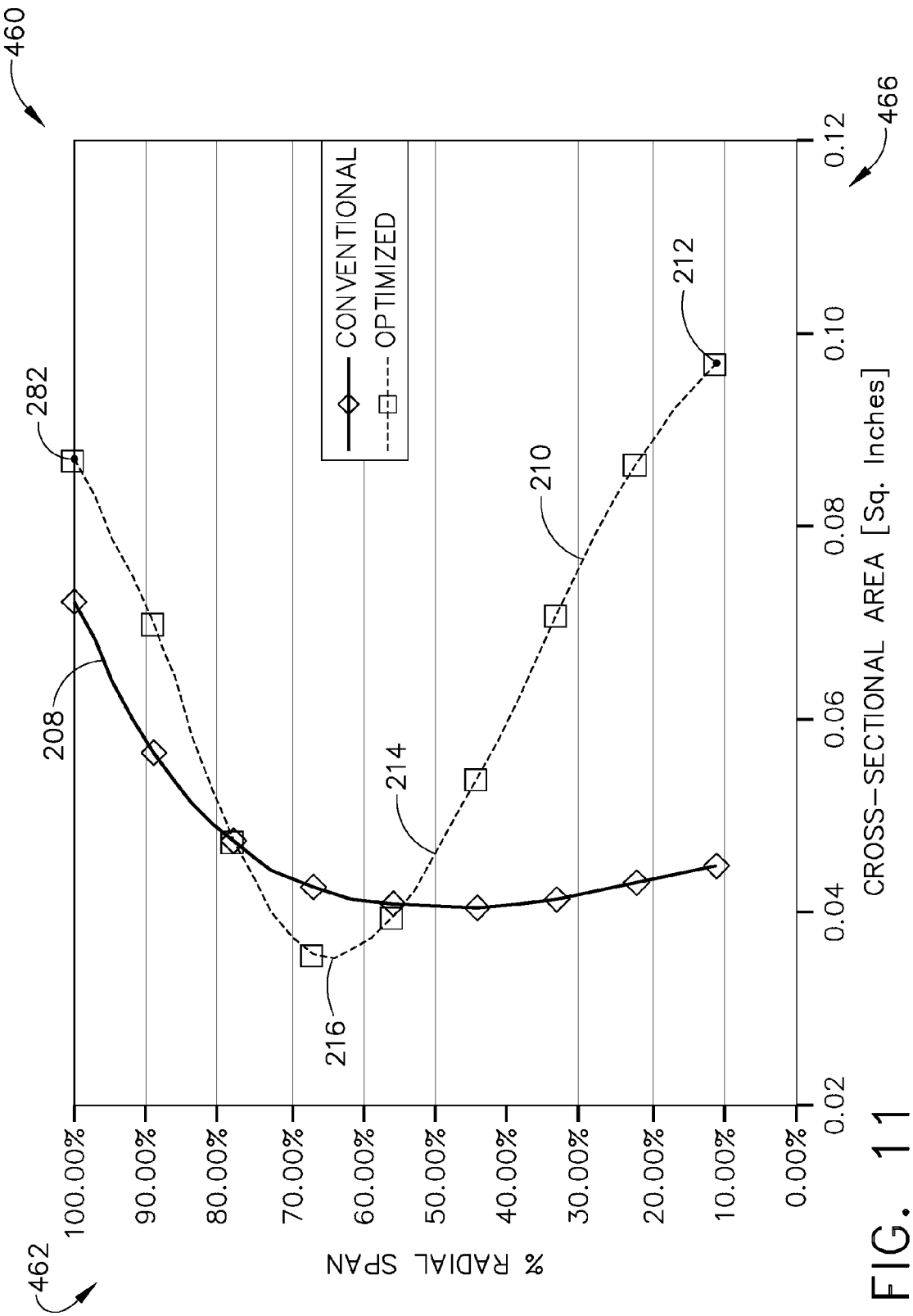
FIG. 11 is a graph illustrating exemplary cross-sectional area values of the multi-curve vane shown in FIG. 4.

FIG. 11 is a graph 460 illustrating exemplary cross-sectional areas of vane 122. In the exemplary embodiment, a profile of vane 122 varies from root portion 284 to tip portion 282 such that the cross-sectional area of vane 122 varies from root portion 284 to tip portion 282. More specifically, in FIG. 11 exemplary values of cross-sectional areas 210 are plotted graphically wherein the ordinate 462 of graph 460 represents a percent of span of airfoil 123 extending from a span near root portion 284 (not shown in FIG. 11) to tip portion 282, and the abscissa 466 of graph 460 represents the cross-sectional area, in square inches, for airfoil 123 at the specific span location. For illustrative purposes, a solid line 208 represents an amount of cross-sectional area associated with a conventional stator vane. Accordingly, at a span location 212 near root portion 284, represented at a radial span of 10%, the cross-sectional area value of airfoil 123 is approximately equal to 0.097 sq. inches. Airfoil 123 converges from that span location 212 to its midpoint 214, wherein the cross-sectional area value is approximately equal to 0.047 sq. inches. Extending outwardly, the cross-sectional area of airfoil 123 continues to decrease until a span location 216 of approximately 65%, wherein the cross-sectional area is approximately equal to 0.035 sq. inches. Radially outward from span location 216, the cross-sectional area of airfoil 123 increases to tip portion 282, wherein the cross-sectional area is approximately equal to 0.085 sq. inches. Accordingly, in the exemplary embodiment, vane 122 includes a converging portion (extending from span location 212 to span location 216), and a diverging portion (extending from span location 216 to span location 282). Alternatively, vane 122 may include any number of converging and diverging portions that each extend between any pair of span locations.

The airfoil profile of vane 122, including the sweep and lean portions and the radially converging and diverging portions, facilitates reducing secondary airflow characteristics and reducing the strength of the secondary airflow. Reduced secondary airflows result in a higher nozzle exit pressure and a higher turbine efficiency. More specifically, the profile of vane 122 facilitates reducing secondary airflows that result in circumferential pressure losses. By reducing the secondary airflows, it was shown that a 14% reduction of aerodynamic losses and a 0.93% improvement in turbine efficiency (EFFA) can be obtained.

In the exemplary embodiment, vane 122 includes a root portion that is larger than conventional stator vane root portions, such as root portion 284. Root portion 284 includes a leading edge portion and a pressure side portion. Root portion 284 facilitates weakening any horseshoe vortexes that may be created near root portion 284 and weakening the passage vortex that may be created along the inner band 56 between two vanes 122. More specifically, the leading edge portion facilitates weakening the pressure side leg of the horseshoe vortexes, which facilitates weakening the passage vortex between vanes 122. The pressure side portion, in addition to the added axial sweep of the leading edge portion, facilitates reducing a pressure gradient that may be generated between the pressure and the suction sides 60 and 62 of airfoil 123. This also facilitates reducing the passage vortex. Moreover, root portion 284 facilitates reducing circumferential pressure losses that may occur.

In one embodiment, a method for assembling a gas turbine engine is provided. The method includes coupling at least one stator assembly that has at least one stator vane extending from an inner band within the gas turbine engine. The stator vane extends from a root portion extending from the inner band to a tip portion. The stator vane includes at least one lean directional change and a plurality of sweep directional changes that are defined between the root portion and the tip portion. The method also includes coupling at least one turbine blade assembly having at least one rotor blade downstream from the stator assembly.

Described herein is a stator vane that may be utilized in a wide variety of engine assemblies. In each embodiment and the described method, the stator vane has an airfoil with variable lean and variable sweep, which facilitate weakening secondary airflows that may reduce the pressure in the turbine assembly and that can cause inefficiencies in the engine. As a result, the total pressure of the combustion gases exiting the turbine assembly may be increased and, consequently, the turbine efficiency may increase. Accordingly, turbine engine performance may be enhanced in a cost-effective and reliable manner with the stator vanes described herein.

Exemplary embodiments of a stator vane and turbine nozzle assembly for a gas turbine engine are described above in detail. The stator vane and turbine nozzle assembly illustrated are not limited to the specific embodiments described herein, but rather, components of each stator vane and each turbine nozzle assembly may be utilized independently and separately from other components described herein.

While the invention has been described in terms of various specific embodiments, those skilled in the art will recognize that the invention can be practiced with modification within the spirit and scope of the claims.

What is claimed is:

1. A method for assembling a gas turbine engine, said method comprising:
    coupling at least one stator assembly including at least one stator vane extending from an inner band within the gas turbine engine, wherein the at least one stator vane extends from a root portion extending from the inner band to a tip portion, and wherein the at least one stator vane includes a midpoint defined approximately halfway between the root portion and the tip portion, and a leading edge that includes a plurality of sweep directional changes defined between the root portion and the midpoint and at least one lean directional change and a plurality of sweep directional changes defined between the root portion and the tip portion; and
    coupling at least one turbine blade assembly including at least one rotor blade downstream from the stator assembly.

2. A method in accordance with claim 1 wherein coupling at least one stator assembly further comprises coupling at least one stator assembly including a stator vane having a midpoint defined approximately halfway between the root portion and the tip portion, and a trailing edge that includes at least one lean directional change defined between the root portion and the midpoint.

3. A method in accordance with claim 1 wherein coupling at least one stator assembly further comprises coupling at least one stator assembly including a stator vane that includes a root portion configured to reduce horseshoe vortexes in the stator assembly.

4. A method in accordance with claim 1 wherein coupling at least one stator assembly further comprises coupling at least one stator assembly including a stator vane that includes a cross-sectional area that converges from the root portion to a midpoint defined approximately halfway between the root portion and the tip portion.

5. A method in accordance with claim 1 wherein coupling at least one stator assembly further comprises coupling at least one stator assembly within the gas turbine engine to facilitate reducing secondary airflows in the gas turbine engine.

6. A turbine nozzle assembly comprising:
    a radially inner band; and
    at least one stator vane extending radially outward from said inner band, said stator vane comprising an airfoil comprising a root portion extending from said inner band to a tip portion and a leading edge extending between said root portion and said tip portion, and a midpoint defined approximately halfway between said root portion and said tip portion, said airfoil further comprising at least one lean directional change and a plurality of sweep directional changes defined between said root portion and said tip portion, and said leading edge comprises at least two sweep directional changes defined between said root portion and said midpoint.

7. A turbine nozzle assembly in accordance with claim 6 wherein said stator vane further comprises a trailing edge extending between said root portion and said tip portion, and a midpoint defined approximately halfway between said root portion and said tip portion, and said trailing edge comprises at least two lean directional changes defined between said root portion and said midpoint.

8. A turbine nozzle assembly in accordance with claim 6 wherein said stator vane further comprises a midpoint defined approximately halfway between said root portion and said tip portion, and a cross-sectional area of said vane converges from said root portion to approximately said midpoint.

9. A turbine nozzle assembly in accordance with claim 6 wherein said stator vane facilitates reducing horseshoe vortexes formed in said turbine nozzle assembly.

10. A turbine nozzle assembly in accordance with claim 6 wherein said stator vane facilitates reducing secondary airflows in said turbine nozzle assembly.

11. A stator vane comprising an airfoil comprising:
    a first sidewall; and
    a second sidewall coupled to said first sidewall at a leading edge and at a trailing edge, said airfoil extending radially from a root portion to a tip portion, each of said leading and trailing edges comprising at least one lean directional change and a plurality of sweep directional changes defined between said root portion and said tip portion, said airfoil further comprises a midpoint defined approximately halfway between said root portion and said tip portion, and said leading edge comprises at least two sweep directional changes defined between said root portion and said midpoint.

12. A stator vane in accordance with claim 11 wherein said airfoil further comprises a midpoint defined approximately halfway between said root portion and said tip portion, and said trailing edge comprises at least two lean directional changes defined between said root portion and said midpoint.

13. A stator vane in accordance with claim 11 wherein said airfoil further comprises a midpoint defined approximately halfway between said root portion and said tip portion, and a cross-sectional area of said vane converges from said root portion to approximately said midpoint.

14. A stator vane in accordance with claim 11 wherein said airfoil root portion facilitates reducing horseshoe vortexes formed in said turbine nozzle assembly.

15. A stator vane in accordance with claim 11 wherein said airfoil root portion facilitates reducing secondary airflows in said turbine nozzle assembly.

* * * * *